V. B. BROWN.
SICKLE.
APPLICATION FILED MAY 15, 1919.
1,353,450.
Patented Sept. 21, 1920.
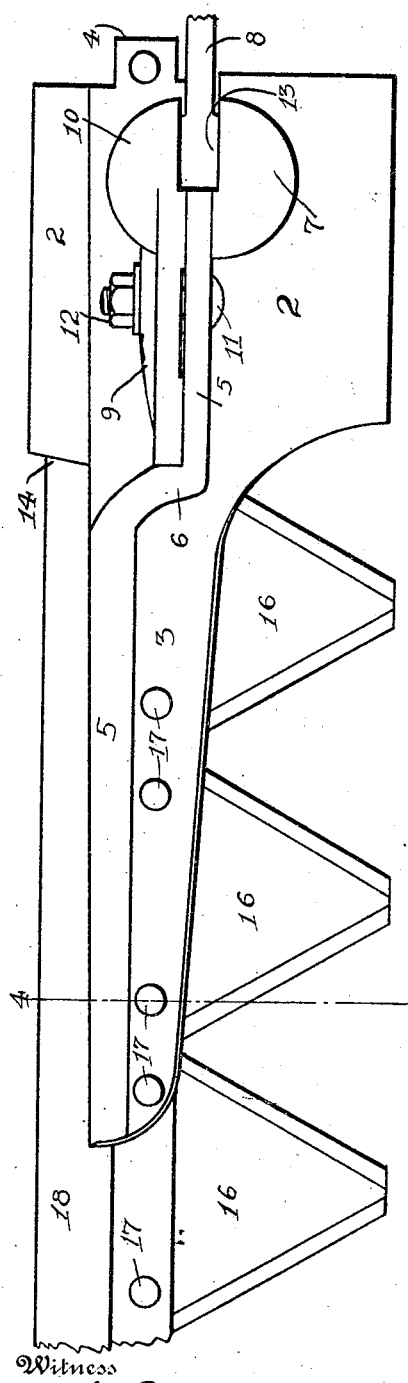
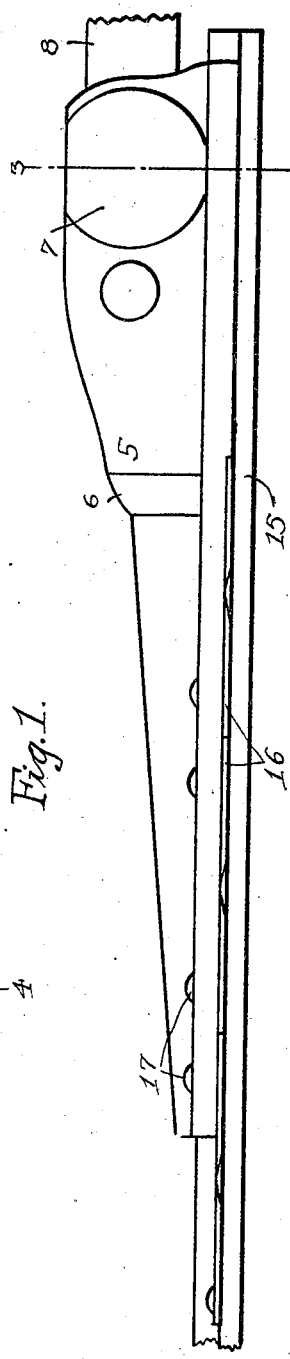
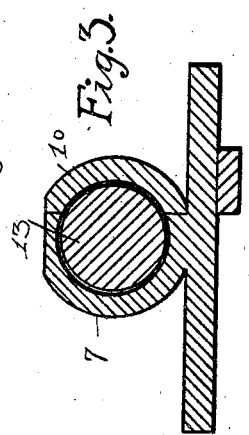
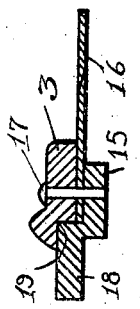
Inventor
V. B. Brown.
By C. A. Snow & Co.
Attorneys

UNITED STATES PATENT OFFICE.

VINCENT B. BROWN, OF PLATTSMOUTH, NEBRASKA.

SICKLE.

1,353,450.  Specification of Letters Patent.  Patented Sept. 21, 1920.

Application filed May 15, 1919. Serial No. 297,311.

*To all whom it may concern:*

Be it known that I, VINCENT B. BROWN, a citizen of the United States, residing at Plattsmouth, in the county of Cass and State of Nebraska, have invented a new and useful Sickle, of which the following is a specification.

This invention relates to improvements in sickles such as are used in mowing machines, the object of the invention being to provide an improved sickle head and reinforced bar by means of which the sickle is materially strengthened and the life thereof considerably prolonged.

With the foregoing and other objects in view, which will appear as the description proceeds, the invention consists in the novel features of construction and combination of parts which will be more fully described hereinafter and particularly pointed out in the claim.

In the drawings accompanying and forming part of this specification,

Figure 1 is a plan view of a portion of a sickle embodying my invention;

Fig. 2 is a side elevation thereof;

Fig. 3 is a cross section taken on the line 3—3 of Fig. 2; and

Fig. 4 is a cross section taken on the line 4—4 of Fig. 1.

The same characters of reference designate the same parts in the different figures of the drawings.

Referring to the drawings, the head comprises a base portion 2 normally lying in a horizontal plane and provided with a forwardly extending portion 3 and a rearwardly extending lug 4 for attachment of the bar thereto. The head is also provided with an upstanding portion or rib 5 extending the entire length thereof and tapered down to the base at the front end thereof. The rib 5 is offset between its end, as shown at 6, and in one end portion is formed a half socket 7 adjacent to one end of the head and approximately at the center of its width. A member 9 carrying a coöperating half socket 10 is adapted to be removably secured to the rib 5 by means of a bolt 11 and nut 12, thereby forming a complete socket for the reception of a ball 13 carried at the end of a pitman 8 by means of which the sickle is operated from the wheel of the mowing machine, the pitman being shown broken away in Figs. 1 and 2. The base portion 2 is cut away at one side thereof to form a shoulder 14 against which a portion of the sickle bar is adapted to abut.

The sickle bar in the present instance comprises a main bar 15 adapted to underlie the head throughout the entire length of the latter and the lug 4, whereby a solid support is afforded the bar, rivets 17 passing through the head and bar and securing them together in such a manner as to be practically an integral structure. Formed along one side of the main bar 15 is an overlapping offset portion or auxiliary bar 18, the purpose of which is to further reinforce and stiffen the main bar. The elongated forwardly extending portion 3 of the head is rabbeted at its underside, as shown at 19, Fig. 4, for the reception of the longitudinal edge of the auxiliary bar 18, as shown in said Fig. 4. The auxiliary bar is shortened or cut away at the rear thereof so as to form a shoulder adapted to abut against the shoulder 14 of the head, as clearly shown in Fig. 1. A plurality of cutting sections or blades 16 are secured to the main bar along the length thereof, some of which are located between the extension 3 and the bar and secured to the bar by the same rivets which secure the head and bar together. It will be understood, of course, that the length of the bar and the number of cutting sections or blades is immaterial, since the bar may be made of any desired size and adapted to carry any desired number of sections, the size of the head and of the auxiliary bar being proportionate to the length of the main bar. It will thus be seen that I have provided a sickle head and bar by means of which the entire structure is considerably stiffened and reinforced.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claim hereto appended.

Having thus described my invention, what I claim is:

A sickle including a base, a portion extending therefrom, an upstanding rib arranged upon the base and said extended portion, a socket integral with one end portion of the rib, and overhanging the base, a socket member detachably connected to the rib and coöperating with the first mentioned socket for engagement with a pitman ball, there being a longitudinally extending rabbet in the lower face of the extended portion of the base, a main bar arranged under the extended portion of the base, an auxiliary bar integral therewith and seated in the rabbet, cutting blades extending between the main bar and the extended portion of the base and abutting against the auxiliary bar, fastening means extending to the main bar, blades and extended portions for fastening them together.

In testimony that I claim the foregoing as my own, I have hereto affixed my signature in the presence of two witnesses.

VINCENT B. BROWN.

Witnesses:
WALTER V. WHITAKER,
J. YOUNGMAN.